United States Patent [19]

Pelegris

[11] Patent Number: 5,677,820
[45] Date of Patent: Oct. 14, 1997

[54] TELEPHONE AND COMMUNICATIONS LINE OVERVOLTAGE PROTECTION APPARATUS

[75] Inventor: Dimitris Jim Pelegris, Mount Prospect, Ill.

[73] Assignee: Oneac Corporation, Libertyville, Ill.

[21] Appl. No.: 683,695

[22] Filed: Jul. 18, 1996

Related U.S. Application Data

[63] Continuation of Ser. No. 341,482, Nov. 17, 1994, abandoned.

[51] Int. Cl.$^6$ .................................................. H02H 3/22
[52] U.S. Cl. ........................... 361/119; 361/127; 379/412
[58] Field of Search .................................... 361/127, 119, 361/56, 58; 379/412

[56] References Cited

U.S. PATENT DOCUMENTS

| | | | |
|---|---|---|---|
| 4,729,055 | 3/1988 | Dorival | 361/119 |
| 4,758,920 | 7/1988 | McCartney | 361/119 |
| 4,907,120 | 3/1990 | Kaczmarek et al. | 361/119 |
| 4,941,063 | 7/1990 | McCartney et al. | 361/119 |
| 5,357,568 | 10/1994 | Pelegris | 361/119 |
| 5,359,657 | 10/1994 | Pelegris | 361/119 |

FOREIGN PATENT DOCUMENTS

| | | |
|---|---|---|
| 0349477 | 1/1990 | European Pat. Off. . |
| 0353166 | 1/1990 | European Pat. Off. . |
| 2093647 | 9/1982 | United Kingdom . |
| 2225908 | 6/1990 | United Kingdom . |
| 2267789 | 12/1993 | United Kingdom . |

OTHER PUBLICATIONS

Search report by UK Patent Office for GB Application No. GB9521750.1 dated 26 Jan. 1996.

*Primary Examiner*—Todd E. DeBoer
*Attorney, Agent, or Firm*—Joan Pennington

[57] ABSTRACT

An overvoltage protection apparatus is used with a pair of telephone or communications TIP/A and RING/B lines including voltage clamping circuitry for clamping voltage signals on the lines at a predetermined voltage potential. The voltage clamping circuitry includes a pair of voltage clamping devices connected in series between the TIP/A and RING/B lines and a third voltage clamping device connected between a junction connection of the pair of the voltage clamping devices and a ground potential connection and current limiting devices for limiting current flow in the lines. The predetermined voltage potential exceeds a primary alternating current (AC) power line peak value by a set tolerance value.

7 Claims, 1 Drawing Sheet

TELEPHONE AND COMMUNICATIONS LINE OVERVOLTAGE PROTECTION APPARATUS

This application is a continuation of application Ser. No. 08/341,482 filed Nov. 17, 1994, now abandoned.

BACKGROUND OF THE INVENTION

1. Field of the Invention

The present invention relates generally to telephone line overvoltage protection devices, and more particularly to an improved telephone and communications line overvoltage protection apparatus.

2. Description of the Prior Art

Overvoltage protection devices are commonly used with telephone lines for protecting telephone equipment against hazardous voltages. Sources of transients include lightning, inductive switching electromagnetic interference (EMI), electrostatic discharge (ESD) and nuclear EMP (NEMP). Overvoltage protection circuitry that overcomes many disadvantages of the prior art circuitry is disclosed in Pelegris, U.S. Pat. No. 5,357,568, issued Oct. 18, 1994, Pelegris, U.S. Pat. No. 5,359,657, issued Oct. 25, 1994, McCartney, U.S. Pat. No. 4,758,920, issued Jul. 19, 1988 and McCartney et al., U.S. Pat. No. 4,941,063, issued Jul. 10, 1990 and assigned to the assignee of the present invention.

A disadvantage of some known overvoltage protection arrangements is that a safety hazard can result from the overvoltage protection arrangement during certain failure modes of operation. For example, one possible ground failure mode includes a disconnected ground connection for the overvoltage protection circuitry with a primary alternating current (AC) power line potential applied to the disconnected or ungrounded ground connection. With this failure mode, some known overvoltage protection circuitry provides an electrical conduction path for the primary power line potential to the TIP and RING lines. A need exists for an improved overvoltage protective apparatus which provides effective and fail-safe operation.

SUMMARY OF THE INVENTION

Among the principal objects of the present invention are to provide an improved telephone line overvoltage protection device and to provide a telephone line overvoltage protection device facilitating reliability and overcoming some disadvantages of known overvoltage protection devices.

In brief, the objects and advantages of the present invention are achieved an overvoltage protection apparatus. The overvoltage protection apparatus is used with a pair of telephone or communications TIP/A and RING/B lines including voltage clamping circuitry for clamping voltage signals on the lines at a predetermined voltage potential. The voltage clamping circuitry includes a pair of voltage clamping devices connected in series between the TIP/A and RING/B lines and a third voltage clamping device connected between a junction connection of the pair of the voltage clamping devices and a ground potential connection and current limiting devices for limiting current flow in the lines. The predetermined voltage potential exceeds a primary alternating current (AC) power line peak value by a set tolerance value.

BRIEF DESCRIPTION OF THE DRAWING

The present invention together with the above and other objects and advantages may best be understood from the following detailed description of the embodiment of the invention illustrated in the drawing, wherein.

DETAILED DESCRIPTION OF THE PREFERRED EMBODIMENT

Figure 1:
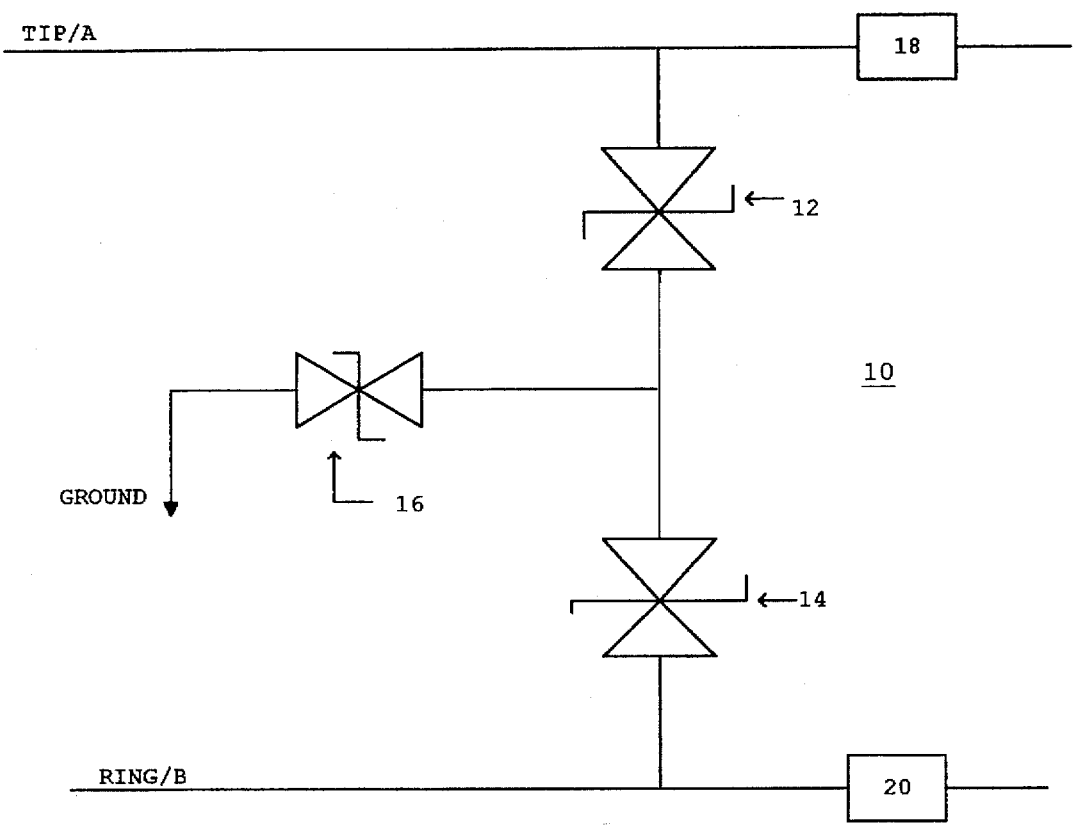
FIG. 1 is a schematic diagram representation of a telephone or communications line overvoltage protection device constructed in accordance with the present invention.

Referring now to the drawing, FIG. 1 illustrates an overvoltage protection apparatus designated as a whole by the reference character 10 and constructed in accordance with principles of the present invention. Overvoltage protection apparatus 10 includes a pair of solid state integrated circuit voltage clamping devices 12 and 14 connected in series between the telephone lines or communications lines labeled TIP/A and RING/B. A third solid state integrated circuit voltage clamping device 16 is connected between a ground potential and a junction connection of the voltage clamping devices 12 and 14. A pair of current limiting devices 18 and 20 are connected in series with the telephone or communications lines TIP/A and RING/B, as shown.

Each of the solid state integrated circuit voltage clamping devices 12, 14 and 16 is a bi-directional transient surge protector with a selected voltage clamping voltage for protecting from lightning, line transients and other high voltage spikes. In accordance with a feature of the invention, the combination of devices 12, 14 and 16 provide voltage clamping on the lines at a predetermined voltage potential that exceeds a primary alternating current (AC) power line peak value (Vt) by a set tolerance value (Voffset). Each of the series combinations of devices 12 and 16 and devices 14 and 16 provides a voltage clamping level that is equal to approximately Vt+Voffset. Each of the devices 12 and 14 advantageously have a voltage breakdown rating selectively provided for a particular application for the telephone or communication lines TIP/A and RING/B. For example, with a desired clamping level (Vt+Voffset) equal to 420 volts and the voltage breakdown ratings of each of the devices 12 and 14 equal to 90 volts, then the voltage breakdown rating of device 16 is provided greater than or equal to 330 volts.

Various commercially available devices or combination of commercially available devices can be used for each individual one of the solid state overvoltage devices 12, 14 and 16, for example, such as, a sidactor part number P6002AB having a minimum breakover voltage rating of 270 volts and manufactured by Teccor Electronics, Inc. of Irving, Tex. Alternatively, transient voltage suppressers such as manufactured and sold by General Semiconductor Industries Inc., a Square D Company under a registered trademark TransZorb, or a metal oxide varistor (MOV) can be used for the voltage clamping devices 12, 14 and 16. clamping devices 12, 14 and 16 due to its fail-safe or fails-shorted operation.

Each of the devices 12 and 14 has a selected breakdown voltage and reverse standoff voltage without conduction represented by Vsel. The breakdown voltage and reverse standoff voltage without conduction of device 16 is selectively provided to be greater than or equal to the threshold value minus the seleted breakdown voltage of devices 12 and 14 or (Vt+Voffset)−Vsel. For example, where the primary AC power line is 240 volts and a set tolerance value Voffset is 180 volts provides a threshold voltage of (240 v+180 volts) or 420 volts, a selected breakdown voltage in a range between 90 volts and 300 volts can be selectively provided for the voltage clamping devices 12, 14 and 16.

Preferably the current limiting resistors 18 and 20 are positive temperature coefficient (PTC) resistors having a higher resistance value with higher current to provide a resettable fuse functional operation. Alternatively, resistors 14 and 16 are fusible resistors that open-circuit for current limiting at a predetermined temperature or corresponding current value.

While the invention has been described with reference to details of the illustrated embodiment, these details are not intended to limit the scope of the invention as defined in the appended claims.

What is claimed is:

1. An overvoltage protection apparatus used with a pair of telephone or communications TIP/A and RING/B lines comprising:

voltage clamping means for clamping voltage signals on said lines at a predetermined voltage potential; said voltage clamping means including a first voltage clamping device and a second voltage clamping device connected in series between the TIP/A and RING/B lines and a third voltage clamping device connected between a junction connection of said said first and second voltage clamping devices and a ground potential connection; said predetermined voltage potential exceeding a primary alternating current (AC) power line peak value by a set tolerance value;

current limiting means for limiting current flow in said lines if AC potential is applied at a respective connection of the TIP or RING line and a first or second voltage clamping device; and wherein both a combination of said first voltage clamping device and said third voltage clamping device and a combination of said second voltage clamping device and said third voltage clamping device has a breakdown voltage without conduction selectively provided above a threshold value represented by (Vt+Voffset), where Vt represents said primary alternating current (AC) power line peak value and Voffset represents said set tolerance value; and wherein said voltage clamping means remains without conduction while said primary alternating current (AC) power line peak value Vt is applied to said ground potential connection while ungrounded; and wherein said first voltage clamping device and said second voltage clamping device have substantially equal breakdown voltage values.

2. An overvoltage protection apparatus as recited in claim 1 wherein each one of said pair of voltage clamping devices has a selected voltage clamping rating represented by Vsel and said third voltage clamping device has a selected voltage clamping rating represented by (Vt+Voffset)−Vsel.

3. An overvoltage protection apparatus as recited in claim 1 wherein said current limiting means are temperature responsive devices.

4. An overvoltage protection apparatus as recited in claim 3 wherein said temperature responsive current limiting means is a resistance fuse that open-circuits for current limiting.

5. An overvoltage protection apparatus as recited in claim 1 wherein each of said first voltage clamping device, said second voltage clamping device and said third voltage clamping device is a solid state device.

6. An overvoltage protection apparatus as recited in claim 1 wherein each of said first voltage clamping device, said second voltage clamping device and said third voltage clamping device is an integrated circuit device.

7. An overvoltage protection device as recited in claim 1 wherein each of said first voltage clamping device, said second voltage clamping device and said third voltage clamping device is a bi-directional semiconductor transient voltage suppressor device.

* * * * *